US010604623B2

(12) United States Patent
Morooka et al.

(10) Patent No.: US 10,604,623 B2
(45) Date of Patent: *Mar. 31, 2020

(54) POLYCARBONATE RESIN, MOLDED ARTICLE, OPTICAL MEMBER, AND LENS

(71) Applicant: FUJIFILM Corporation, Tokyo (JP)

(72) Inventors: Naoyuki Morooka, Ashigarakami-gun (JP); Shigeki Uehira, Ashigarakami-gun (JP); Takafumi Nakayama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 16/107,460

(22) Filed: Aug. 21, 2018

(65) Prior Publication Data
US 2018/0355106 A1    Dec. 13, 2018

Related U.S. Application Data

(63) Continuation of application No. PCT/JP2017/006299, filed on Feb. 21, 2017.

(30) Foreign Application Priority Data

Feb. 24, 2016  (JP) .................. 2016-032842

(51) Int. Cl.
| | |
|---|---|
| C08G 64/02 | (2006.01) |
| C08G 64/16 | (2006.01) |
| C08G 64/24 | (2006.01) |
| C08G 64/06 | (2006.01) |
| G02B 1/04 | (2006.01) |

(52) U.S. Cl.
CPC ......... *C08G 64/1608* (2013.01); *C08G 64/06* (2013.01); *C08G 64/24* (2013.01); *G02B 1/041* (2013.01)

(58) Field of Classification Search
USPC .............................................. 528/196, 198
See application file for complete search history.

(56) References Cited

U.S. PATENT DOCUMENTS

| | | | |
|---|---|---|---|
| 6,320,020 | B1 | 11/2001 | Takuma et al. |
| 6,638,582 | B1 | 10/2003 | Uchiyama et al. |
| 9,334,352 | B2 | 5/2016 | Someya et al. |
| 9,994,661 | B2 | 6/2018 | Morooka |
| 10,370,473 | B2 | 8/2019 | Nakayama et al. |
| 2009/0143560 | A1 | 6/2009 | Hatanaka et al. |
| 2010/0044686 | A1 | 2/2010 | Morishita |
| 2010/0168444 | A1 | 7/2010 | Chen et al. |
| 2010/0201925 | A1 | 8/2010 | Kim et al. |
| 2012/0251948 | A1 | 10/2012 | Iizuka et al. |
| 2013/0105767 | A1 | 5/2013 | Lin et al. |
| 2014/0284556 | A1 | 9/2014 | Cheng et al. |
| 2015/0197592 | A1 | 7/2015 | Someya et al. |
| 2017/0044312 | A1 | 2/2017 | Kato et al. |
| 2018/0305486 | A1 | 10/2018 | Nakayama et al. |
| 2018/0362709 | A1 | 12/2018 | Uehira et al. |

FOREIGN PATENT DOCUMENTS

| | | | |
|---|---|---|---|
| CN | 101475568 | A | 7/2009 |
| CN | 102659526 | A | 9/2012 |
| JP | 06-228296 | A | 8/1994 |
| JP | 06-322087 | A | 11/1994 |
| JP | 08-113565 | A | 5/1996 |
| JP | 2000-351846 | A | 12/2000 |
| JP | 2001-106761 | A | 4/2001 |
| JP | 4010810 | B2 | 11/2007 |
| JP | 2008-081418 | A | 4/2008 |
| JP | 2008-094987 | A | 4/2008 |
| JP | 2009-126011 | A | 6/2009 |
| JP | 2009-234999 | A | 10/2009 |

(Continued)

OTHER PUBLICATIONS

N.B. Chapman et al., "Correlation Analysis in Chemistry", Recent Advances, Plenum Press, pp. 439-540, 1978 (105 pages total).
International Search Report dated May 16, 2017 in counterpart International Application No. PCT/JP2017/006299.
International Preliminary Report on Patentability with the translation of Written Opinion dated Aug. 28, 2018 in counterpart International Application No. PCT/JP2017/006299.
Corwin Hansch et al., "A Survey of Hammett Substituent Constants and Resonance and Field Parameters", 1991, Chem. Rev., 91, pp. 165-195 (31 pages total).
International Preliminary Report on Patentability dated Sep. 5, 2017 in international Application No. PCT/JP2016/056365.
Translation of Written Opinion of the International Searching Authority dated May 24, 2016 in international Application No. PCT/JP2016/056365.

(Continued)

*Primary Examiner* — Terressa Boykin
(74) *Attorney, Agent, or Firm* — Sughrue Mion, PLLC

(57) ABSTRACT

Disclosed is a polycarbonate resin including a constitutional unit represented by Formula (1). The resin provides a molded article having a sufficiently low Abbe number and excellent durability under high temperature and high humidity. $R^1$ to $R^4$ are a hydrogen atom or a substituent having $\sigma_p$ of less than $-0.15$, $R^5$ to $R^7$ represent a substituent, $Ar^{11}$ and $Ar^{12}$ represent an aryl or heteroaryl group, and $Ar^{13}$ is an aromatic fused ring group.

(1)

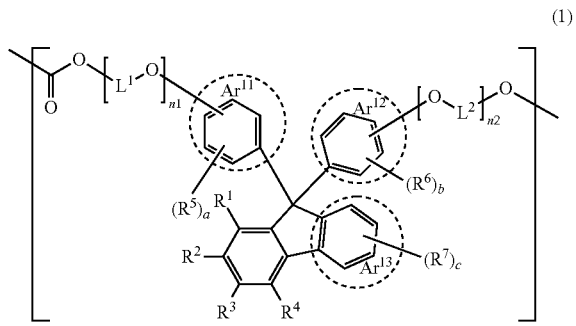

12 Claims, No Drawings

(56) References Cited

FOREIGN PATENT DOCUMENTS

| | | |
|---|---|---|
| JP | 2009-249307 A | 10/2009 |
| JP | 2010-523756 A | 7/2010 |
| JP | 2010-254806 A | 11/2010 |
| JP | 2011-068624 A | 4/2011 |
| JP | 2013-061624 A | 4/2013 |
| JP | 2013-64117 A | 4/2013 |
| JP | 5249781 B2 | 7/2013 |
| JP | 2014-080572 A | 5/2014 |
| JP | 2014-205829 A | 10/2014 |
| JP | 2015-193809 A | 11/2015 |
| JP | 2015-212389 A | 11/2015 |
| KR | 10-2017-0047977 A | 5/2017 |
| WO | 2006/065105 A1 | 6/2006 |
| WO | 2007/055390 A1 | 5/2007 |
| WO | 2012/147712 A1 | 11/2012 |
| WO | 2015/076601 A1 | 5/2015 |
| WO | 2015/170691 A1 | 11/2015 |
| WO | 2017/146023 A1 | 8/2017 |

OTHER PUBLICATIONS

Office Action dated Oct. 3, 2017 issued by the United States Patent and Trademark Office in U.S. Appl. No. 15/678,614.

Notice of Allowance dated Feb. 9, 2018 issued by the United States Patent and Trademark Office in U.S. Appl. No. 15/678,614.

Office Action dated Sep. 3, 2019, from the Japanese Patent Office in counterpart Japanese application No. 2018-501693.

International Preliminary Report on Patentability and Written Opinion issued from the International Bureau in International Application No. PCT/JP2017/006297, dated Aug. 28, 2018 (corresponds to U.S. Appl. No. 16/103,457).

International Search Report, issued by International Searching Authority in International Application No. PCT/JP2017/006297, dated May 23, 2017 (corresponds to U.S. Appl. No. 16/103,457).

International Search Report of PCT/JP2016/087132, filed Mar. 14, 2017 (corresponds to U.S. Appl. No. 16/019,922).

John E. McMurry et al. "Synthesis of isocaryophylliene by titanium-induced keto ester cyclization", Tetrahedron Letters, vol. 24, No. 18, 1983 (pp. 1885-1888).

R. R. Rajawinslin et al. "Iron/acetic acid mediated intermolecular tandem C—C and C—N bond formation; an easy access to acridinone and quinoline derivatives", RSC Advances, Royal Society of Chemistry, vol. 4, 2014 (pp. 37806-37811).

R.E. Hughes et al. "Total Synthesis of d,l-caryophyllene and d,l-isocaryophyllene", J. Am. Chem. Soc., vol. 85, 1963 (pp. 362-363).

Written Opinion issued by the International Searching Authority in International Application No. PCT/JP2017/006297, dated May 23, 2017 (corresponds to U.S. Appl. No. 16/103,457).

Office Action dated Aug. 13, 2019, from the Japanese Patent Office in JP Application No. 2018-501692 (corresponds to U.S. Appl. No. 16/103,457).

Office Action dated Oct. 19, 2018, issued by the USPTO in U.S. Appl. No. 16/019,922.

Ho Wan Ham et al. CAS: 163:45069, 2015 (3 pages total).

Jong-Wook Park et al. CAS: 145:73051, 2006 (3 pages total).

Notice of Allowance dated Mar. 22, 2019 issued by the USPTO in U.S. Appl. No. 16/019,922.

Office Action dated Apr. 16, 2019 issued by the Japanese Patent Office in JP application No. 2017-558923 (corresponds to U.S. Appl. No. 16/019,922).

Frank D. Popp, "Synthesis of Potential Antineoplastic Agents. XXI. Compounds Related to Ellipticine", Journal of Heterocyclic Chemistry, Dec. 1972, vol. 9, pp. 1399-1401 (3 pages total).

International Preliminary Report on Patentability issued from the International Bureau in International Application No. PCT/JP2016/087132, dated Jul. 3, 2018 (corresponding to U.S. Appl. No. 16/019,922).

Written Opinion in International Application No. PCT/JP2016/087132, dated Mar. 14, 2017 (corresponding to U.S. Appl. No. 16/019,922).

Notice of Allowance dated Nov. 22, 2019 issued by the USPTO in U.S. Appl. No. 16/103,457.

POLYCARBONATE RESIN, MOLDED ARTICLE, OPTICAL MEMBER, AND LENS

CROSS-REFERENCE TO RELATED APPLICATIONS

This application is a Continuation of PCT International Application No. PCT/JP2017/006299, filed on Feb. 21, 2017, which claims priority under 35 U.S.C. Section 119(a) to Japanese Patent Application No. 2016-032842 filed on Feb. 24, 2016. Each of the above applications is hereby expressly incorporated by reference, in its entirety, into the present application.

BACKGROUND OF THE INVENTION

1. Field of the Invention

The present invention relates to a polycarbonate resin, a molded article, an optical member, and a lens.

2. Description of the Related Art

In the related art, a glass material has been used in an optical member of an image pick-up module of a camera, a video camera, a camera-equipped cellular phone, a videophone, a camera-equipped intercom, or the like. Since a glass material has various optical properties and has excellent environmental resistance, the glass material has been preferably used but has disadvantages in that reduction in weight and size is not easy, and workability and productivity are poor. On the other hand, an optical member using a thermoplastic resin may be mass-produced and may have excellent workability, and thus the optical member has been used for various optical members in recent years.

An optical member using a thermoplastic resin has been studied to exhibit various optical properties and to improve durability by using a resin including a constitutional unit having a specific structure.

For example, in JP2010-254806A, JP2013-64117A, and JP4010810B, resins each including a constitutional unit having a fluorene skeleton are disclosed. In JP2010-254806A, a polycarbonate resin including 9,9-bis(4-hydroxy-3-methylphenyl) fluorene and bis(4-hydroxy-3-methylphenyl) sulfide is disclosed. In JP2013-64117A, a polyester resin using a dicarboxylic acid component including a monocyclic aromatic dicarboxylic acid component and a dicarboxylic acid component having a fluorene skeleton and a diol component including a compound having a 9,9-bis(hydroxy (poly) alkoxyaryl) fluorene skeleton as polymerization components is disclosed. In JP4010810B, a polycarbonate resin having a fluorene skeleton, which is a resin including a constitutional unit having negative refractive index anisotropy and a constitutional unit having positive refractive index anisotropy is disclosed.

SUMMARY OF THE INVENTION

In recent years, along with miniaturization of image pick-up modules, miniaturizing optical members used in image pick-up modules has been required. As the optical member becomes miniaturized, chromatic aberration becomes problematic, and thus correcting the chromatic aberration by reducing the Abbe number has been studied. However, the present inventors have studied the use of a molded article of the above-described resin including a constitutional unit having a fluorene skeleton as an optical member, and have clearly found that, in a molded article of the thermoplastic resin in the related art, the Abbe number is not sufficiently reduced. In the molded article of the thermoplastic resin in the related art, durability under high temperature and high humidity is not sufficient, and improvement is required.

In order to solve the problems in the related art, the present inventors have conducted research for the purpose of providing a resin that may mold a molded article of a thermoplastic resin having a sufficiently low Abbe number and having excellent durability under high temperature and high humidity.

As a result of intensive studies in order to solve the above problems, the present inventors have found that, in a case where a polycarbonate resin including a constitutional unit having a specific structure is used, a molded article (hereinafter, also referred to as a molded article) of the thermoplastic resin having a sufficiently low Abbe number and having excellent durability under high temperature and high humidity may be obtained.

Specifically, the present invention has the following configuration.

[1] A polycarbonate resin having a constitutional unit represented by Formula (1);

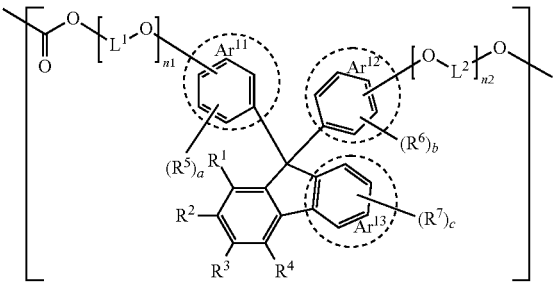

Formula (1)

in Formula (1), $R^1$ to $R^4$ are each independently a hydrogen atom or a substituent having a Hammett substituent constant $\sigma_p$ value of less than −0.15, except for an aryl group, a heteroaryl group, and a substituent having a reactive group, and in $R^1$ to $R^4$, substituents adjacent to each other are not bonded to each other to form a fused ring;

$R^5$ to $R^7$ each independently represent a substituent;

a to c are each independently 0 or more and represent an integer of the maximum number or less by which each ring is substitutable;

$Ar^{11}$ and $Ar^{12}$ each independently represent an aryl group including a benzene ring surrounded by a broken line or a heteroaryl group including a benzene ring surrounded by a broken line as one of fused rings, and $Ar^{13}$ is an aromatic fused ring group including a benzene ring surrounded by a broken line as one of fused rings;

$L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;

n1 and n2 each independently represent an integer of 0 to 10;

in a case where $Ar^{11}$ and $Ar^{12}$ are each independently an aromatic fused ring group including a benzene ring surrounded by a broken line, $R^5$, $R^6$, —O-[$L^1$-O]$_n$—, and —O-[$L^2$-O]$_{n2}$— may be each independently substituted at a benzene ring surrounded by a broken line or substituted at a fused ring other than the benzene ring surrounded by a broken line; and R⁷ may be substituted at a benzene ring surrounded by a broken line or may be substituted at a fused ring other than the benzene ring surrounded by a broken line.

[2] The polycarbonate resin according to [1], in which the constitutional unit is a constitutional unit represented by Formula (2);

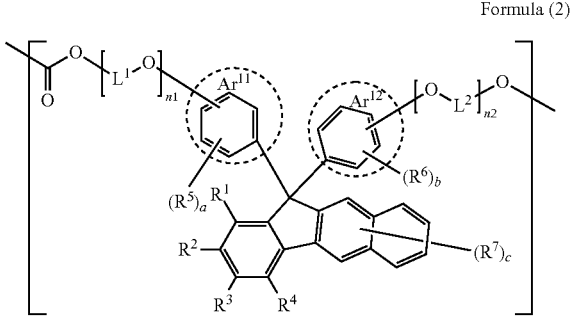

Formula (2)

in Formula (2), $R^1$ to $R^4$ are each independently a hydrogen atom or a substituent having a Hammett substituent constant $\sigma_p$ value of less than −0.15, except for an aryl group, a heteroaryl group, and a substituent having a reactive group, and in $R^1$ to $R^4$, substituents adjacent to each other are not bonded to each other to form a fused ring;

$R^5$ to $R^7$ each independently represent a substituent;

a to c are each independently 0 or more and represent an integer of the maximum number or less by which each ring is substitutable;

$Ar^{11}$ and $Ar^{12}$ each independently represent an aryl group including a benzene ring surrounded by a broken line or a heteroaryl group including a benzene ring surrounded by a broken line as one of fused rings;

$L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;

n1 and n2 each independently represent an integer of 0 to 10; and in a case where $Ar^{11}$ and $Ar^{12}$ are each independently an aromatic fused ring group including a benzene ring surrounded by a broken line, $R^5$, $R^6$, $-O-[L^1-O]_{n1}-$, and $-O-[L^2-O]_{n2}-$ may be each independently substituted at a benzene ring surrounded by a broken line or substituted at a fused ring other than the benzene ring surrounded by a broken line.

[3] The polycarbonate resin according to [1] or [2], in which at least one of $R^1$, $R^2$, $R^3$, or $R^4$ is a substituent having a Hammett substituent constant $\sigma_p$ value of less than −0.15, except for an aryl group, a heteroaryl group, and a substituent having a reactive group.

[4] The polycarbonate resin according to any one of [1] to [3], in which $R^2$ and $R^3$ are substituents having a Hammett substituent constant $\sigma_p$ value of less than −0.15, except for an aryl group, a heteroaryl group, and a substituent having a reactive group.

[5] The polycarbonate resin according to any one of [1] to [4], in which $R^2$ and $R^3$ are methoxy groups.

[6] The polycarbonate resin according to any one of [1] to [5], further having a constitutional unit represented by Formula (11);

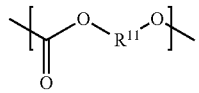

Formula (11)

in Formula (11), $R^{11}$ is a group including at least one selected from an alkylene group having 2 to 8 carbon atoms, a cycloalkylene group having 5 to 12 carbon atoms, an arylene group having 6 to 40 carbon atoms, and a heteroarylene group having 6 to 40 carbon atoms.

[7] The polycarbonate resin according to [6], in which $R^{11}$ in the constitutional unit represented by Formula (11) includes a group represented by Structure (12) or (13);

(12)

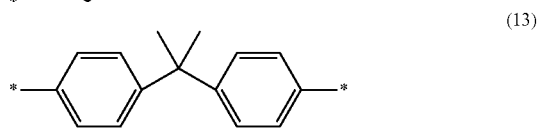

(13)

in Structures (12) and (13), * represents a linking site in a main chain of the constitutional unit represented by Formula (11).

[8] The polycarbonate resin according to [6] or [7], in which a total amount of the constitutional unit represented by Formula (1) and the constitutional unit represented by Formula (11) is 90 mol % or more with respect to the entire constitutional unit of the polycarbonate resin, and in which a molar ratio of the constitutional unit represented by Formula (1) and the constitutional unit represented by Formula (11) is 40:60 to 90:10.

[9] A molded article of the polycarbonate resin according to any one of [1] to [8].

[10] The molded article according to [9], in which an Abbe number is 13 to 25.

[11] An optical member comprising the molded article according to [9] or [10].

[12] A lens comprising the molded article according to [9] or [10].

According to the present invention, it is possible to obtain a molded article having a sufficiently low Abbe number and having excellent durability under high temperature and high humidity. The molded article molded from a resin according to the present invention has the above characteristics, and thus is preferably used in an optical member, a lens, or the like.

DESCRIPTION OF THE PREFERRED EMBODIMENTS

Hereinafter, the present invention is specifically described. The following description of components may be made based on a representative embodiment or a specific example, but the present invention is not limited to the embodiment. In the present specification, the numerical range expressed by using "to" means a range including numerical values described before and after "to" as a lower limit value and an upper limit value.

In the present specification, with respect to a group (atomic group), in a case where substitution or unsubstitution is not described, the group includes both of a group having a substituent and a group not having a substituent.

For example, an "alkyl group" includes not only an alkyl group not having a substituent (unsubstituted alkyl group) but also an alkyl group having a substituent (substituted alkyl group).

(Polycarbonate Resin)

The present invention relates to a polycarbonate resin including a constitutional unit represented by Formula (1).

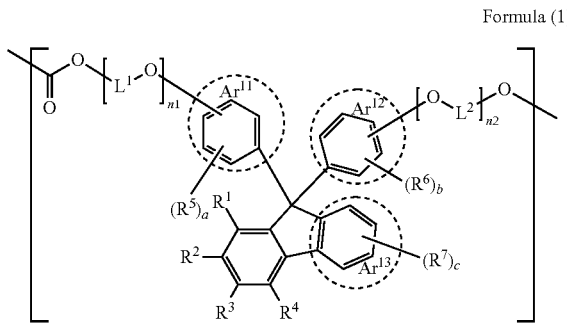

Formula (1)

In Formula (1), $R^1$ to $R^4$ are each independently a hydrogen atom or a substituent having a Hammett substituent constant $\sigma_p$ value of less than −0.15, except for an aryl group, a heteroaryl group, and a substituent having a reactive group, and in $R^1$ to $R^4$, substituents adjacent to each other are not bonded to each other to form a fused ring.

$R^5$ to $R^7$ each independently represent a substituent.

a to c are each independently 0 or more and represent an integer of the maximum number or less by which each ring is substitutable.

$Ar^{11}$ and $Ar^{12}$ each independently represent an aryl group including a benzene ring surrounded by a broken line or a heteroaryl group including a benzene ring surrounded by a broken line as one of fused rings, and $Ar^{13}$ is an aromatic fused ring group including a benzene ring surrounded by a broken line as one of fused rings.

$L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms.

n1 and n2 each independently represent an integer of 0 to 10.

In a case where $Ar^{11}$ and $Ar^{12}$ are each independently an aromatic fused ring group including a benzene ring surrounded by a broken line as one of fused rings, $R^5$, $R^6$, —O-[$L^1$-O]$_{n1}$—, and —O-[$L^2$-O]$_2$— may be each independently substituted at a benzene ring surrounded by a broken line or substituted at a fused ring other than the benzene ring surrounded by a broken line.

$R^7$ may be substituted at a benzene ring surrounded by a broken line and may be substituted at a fused ring other than the benzene ring surrounded by a broken line.

Since the polycarbonate resin of the present invention is a polycarbonate resin including the above constitutional unit, it is possible to form a molded article having a sufficiently low Abbe number. The polycarbonate resin of the present invention may form a molded article having excellent durability under high temperature and high humidity.

The polycarbonate resin of the present invention is a resin including the constitutional unit, and thus fluidity is excellent, moldability is satisfactory, and the generation of the optical strain of the molded article in a case of molding the molded article may be suppressed.

In this manner, the molded article molded from the polycarbonate resin of the present invention also has excellent optical properties and durability, and thus has a high quality as an optical member. Since the fluidity of the resin is excellent, moldability is satisfactory.

In Formula (1), $R^1$ to $R^4$ are each independently a hydrogen atom or a substituent having a Hammett substituent constant $\sigma_p$ value of less than −0.15, except for an aryl group, a heteroaryl group, and a substituent having a reactive group. In $R^1$ to $R^4$, substituents adjacent to each other are not bonded to each other to form a fused ring. The reactive group is a (meth)acryloyl group.

At least one of $R^1$, $R^2$, $R^3$, or $R^4$ is preferably a substituent having a Hammett substituent constant $\sigma_p$ value of less than −0.15, except for an aryl group, a heteroaryl group, and a substituent having a reactive group. Since at least one of $R^1$, $R^2$, $R^3$, or $R^4$ is an electron donating group having the Hammett substituent constant $\sigma_p$ in the above range, the Abbe number of the molded article may be further reduced. It is considered that this is because the ultraviolet absorption of the constitutional unit is shifted to the long wavelength side by the electron donating group, the wavelength dependence of the refractive index in the visible light range is strengthened, and thus the Abbe number may be reduced.

The Hammett substituent constant $\sigma_p$ value is more preferably −0.20 or less and even more preferably −0.25 or less. A lower limit value of the Hammett substituent constant $\sigma_p$ value is preferably −0.7.

The Hammett substituent constant $\sigma_p$ value is disclosed in Correlation Analysis in Chemistry, Ed. By N. B. Chapman, J. Shorter, p. 439 to 540, Plenum Press (1978) and reference documents which are referred thereto. Here, $\sigma_p$ is defined as below.

$$\sigma_p = \mathrm{Log}(Ka/Ka^0) = pKa^0 - pKa$$

$Ka^0$ is an acid dissociation constant of benzoic acid at 25° C. in water. Ka is an acid dissociation constant of a para-position substituted benzoic acid at 25° C. in water. Those not described in the above document may be obtained by the method described in the same documents.

Examples of the substituent having a Hammett substituent constant $\sigma_p$ value of less than −0.15 include a cyclopropyl group (-cyclo$C_3H_5$, $\sigma_p$ value: −0.21), an amino group (—$NH_2$, $\sigma_p$ value: −0.57), a dimethylamino group (—N($CH_3$)$_2$, $\sigma_p$ value: −0.63), a benzoylamino group (—$NHCOC_6H_5$, $\sigma_p$ value: −0.19), a hydroxy group (—OH, $\sigma_p$ value: −0.38), a methoxy group (—$OCH_3$, $\sigma_p$ value: −0.28), an ethoxy group (—$OC_2H_5$, $\sigma_p$ value: −0.21), and a propoxy group (—$OC_3H_7$, $\sigma_p$ value: −0.25). In a case where a plurality of substituents in $R^1$ to $R^4$ are substituents having a Hammett substituent constant $\sigma_p$ value of less than −0.15, these substituents may be identical to or different from each other.

In Formula (1), it is preferable that at least one of $R^2$ or $R^3$ is a substituent having a Hammett substituent constant $\sigma_p$ value of less than −0.15, except for an aryl group, a heteroaryl group, and a substituent having a reactive group, and it is more preferable that $R^2$ and $R^3$ are substituents having a Hammett substituent constant $\sigma_p$ value of less than −0.15, except for an aryl group, a heteroaryl group, and a substituent having a reactive group. In a case where a Hammett substituent constant $\sigma_p$ value of the substituent arranged in a specific position is caused to be −0.15 or less as described above, the Abbe number of the molded article may be more effectively reduced.

The substituent having a Hammett substituent constant $\sigma_p$ value of less than −0.15 is preferably an alkyl group, an alkoxy group, or a dialkylamino group and more preferably an alkoxy group. The alkoxy group is preferably a methoxy group, an ethoxy group, or a propoxy group and more preferably a methoxy group.

In a case where at least one of $R^1$, $R^2$, $R^3$, or $R^4$ is caused to be an alkoxy group as above, the structure of the constitutional unit represented by Formula (1) becomes compact, and also the ultraviolet absorption of the constitutional unit may be shifted to the long wavelength side. In this manner, the Abbe number of the molded article may be effectively reduced. In a case where at least one of $R^1$, $R^2$, $R^3$, or $R^4$ is caused to be an alkoxy group as described above, the coloration of the molded article may be suppressed.

According to the present invention, it is preferable that at least one of $R^2$ or $R^3$ is an alkoxy group, and it is more preferable that $R^2$ and $R^3$ are alkoxy groups. $R^2$ and $R^3$ are preferably a methoxy group, an ethoxy group, or a propoxy group and more preferably a methoxy group.

In Formula (1), $R^5$ to $R^7$ each independently represent a substituent. The substituents represented by $R^5$ to $R^7$ are not particularly limited, and examples thereof include a halogen atom, a halogenated alkyl group, an alkyl group, an alkenyl group, an acyl group, a hydroxyl group, a hydroxyalkyl group, an alkoxy group, an aryl group, a heteroaryl group, and an alicyclic group. The substituent represented by $R^5$ to $R^7$ is preferably an alkyl group, an alkoxy group, or an aryl group, more preferably an alkyl group having 1 to 5 carbon atoms, an alkoxy group having 1 to 5 carbon atoms, or a phenyl group, and particularly preferably a methyl group, a methoxy group, or a phenyl group.

In Formula (1), $Ar^{11}$ and $Ar^{12}$ each independently represent an aryl group including a benzene ring surrounded by a broken line or a heteroaryl group including a benzene ring surrounded by a broken line as one of fused rings. Among these, $Ar^{11}$ and $Ar^{12}$ are each independently and preferably an aryl group including a benzene ring surrounded by a broken line. In a case of an aryl group including a benzene ring surrounded by a broken line represented by $Ar^{11}$ and $Ar^{12}$, the aryl group is preferably an aryl group having 6 to 18 carbon atoms, more preferably an aryl group having 6 to 14 carbon atoms, and particularly preferably an aryl group having 6 to 10 carbon atoms. In a case of a heteroaryl group including a benzene ring surrounded by a broken line as one of fused rings represented by $Ar^{11}$ and $Ar^{12}$, the heteroaryl group is preferably a heteroaryl group having 9 to 14 ring members and more preferably a heteroaryl group having 9 or 10 ring members. Examples of the heteroatom forming the heteroaryl group that may have a substituent represented by $Ar^{11}$ and $Ar^{12}$ include a nitrogen atom, an oxygen atom, and a sulfur atom.

$Ar^{11}$ and $Ar^{12}$ may be each independently an aryl group only including a benzene ring surrounded by a broken line and may be an aromatic fused ring group including a benzene ring surrounded by a broken line as one of fused rings. In the present specification, the fused ring of the aromatic fused ring group has aromaticity as the entire fused ring.

In Formula (1), $Ar^{13}$ is an aromatic fused ring group including a benzene ring surrounded by a broken line as one of fused rings. The aromatic fused ring group represented by $Ar^{13}$ is preferably an aryl group having 9 to 12 carbon atoms or a heteroaryl group having 9 to 14 ring members and more preferably an aryl group having 9 or 10 carbon atoms or a heteroaryl group having 9 or 10 ring members. Among these, the aromatic fused ring group represented by $Ar^{13}$ is preferably an aryl group having 9 or 10 carbon atoms and more preferably a naphthyl group.

In Formula (1), $L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms. $L^1$ and $L^2$ are each independently and preferably an alkylene group having 2 to 8 carbon atoms, more preferably an alkylene group having 2 to 4 carbon atoms, and even more preferably an ethylene group.

In Formula (1), a to c are each independently 0 or more, may be an integer of the maximum number or less by which each ring is substitutable, is preferably an integer of 0 to 4, more preferably an integer of 0 to 3, even more preferably an integer of 0 to 2, still even more preferably 0 or 1, and particularly preferably 0.

In Formula (1), n1 and n2 may be each independently an integer of 0 to 10, is preferably an integer of 0 to 4, more preferably an integer of 0 to 2, even more preferably 0 or 1, and particularly preferably 0.

In Formula (1), in a case where $Ar^{11}$ and $Ar^{12}$ are each independently an aromatic fused ring group including a benzene ring surrounded by a broken line, $R^5$, $R^6$, —O-[$L^1$-O]$_{n1}$—, and —O-[$L^2$-O]$_{n2}$— may be each independently substituted at a benzene ring surrounded by a broken line or substituted at a fused ring other than the benzene ring surrounded by a broken line. In this manner, $R^7$ may be substituted at a benzene ring surrounded by a broken line and may be substituted at a fused ring other than the benzene ring surrounded by a broken line.

The constitutional unit is preferably a constitutional unit represented by Formula (2).

Formula (2)

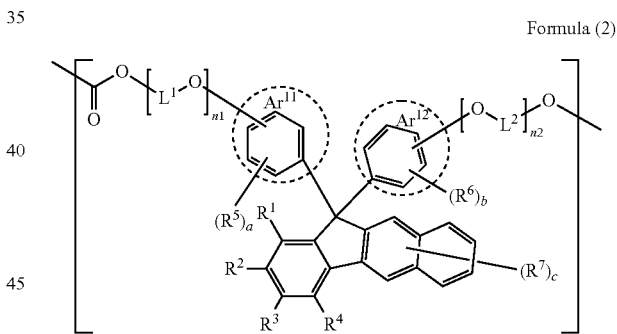

In Formula (2), $R^1$ to $R^4$ are each independently a hydrogen atom or a substituent having a Hammett substituent constant $\sigma_p$ value of less than −0.15, except for an aryl group, a heteroaryl group, and a substituent having a reactive group, and in $R^1$ to $R^4$, substituents adjacent to each other are not bonded to each other to form a fused ring.

$R^5$ to $R^7$ each independently represent a substituent.

a to c are each independently 0 or more and represent an integer of the maximum number or less by which each ring is substitutable.

$Ar^{11}$ and $Ar^{12}$ each independently represent a heteroaryl group including an aryl group including a benzene ring surrounded by a broken line or a benzene ring surrounded by a broken line, as one of fused rings.

$L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms.

n1 and n2 each independently represent an integer of 0 to 10.

In a case where $Ar^{11}$ and $Ar^{12}$ are each independently an aromatic fused ring group including a benzene ring surrounded by a broken line, and $R^5$, $R^6$, $-O-[L^1-O]_{n1}-$, and $-O-[L^2-O]_{n2}-$ may be each independently substituted at a benzene ring surrounded by a broken line or substituted at a fused ring other than the benzene ring surrounded by a broken line.

The preferable ranges of $R^1$ to $R^4$ in Formula (2) are the same as the preferable ranges of $R^1$ to $R^4$ in Formula (1).

The preferable ranges of $R^5$ to $R^7$ in Formula (2) are the same as the preferable ranges of $R^5$ to $R^7$ in Formula (1).

The preferable ranges of $Ar^{11}$ and $Ar^{12}$ in Formula (2) are the same as the preferable ranges of $Ar^{11}$ and $Ar^{12}$ in Formula (1).

The preferable ranges of $L^1$ and $L^2$ in Formula (2) are the same as the preferable ranges of $L^1$ and $L^2$ in Formula (1).

The preferable ranges of n1 and n2 in Formula (2) are the same as the preferable ranges of n1 and n2 in Formula (1).

The preferable ranges of a and b in Formula (2) are the same as the preferable ranges of a and b in Formula (1). c in Formula (2) is preferably an integer of 0 to 6, more preferably an integer of 0 to 4, even more preferably an integer of 0 to 3, even more preferably an integer of 0 to 2, and particularly preferably 0 or 1.

Hereinafter, specific examples of the constitutional unit represented by Formula (1) are listed, but the present invention is not limited to the following constitutional units.

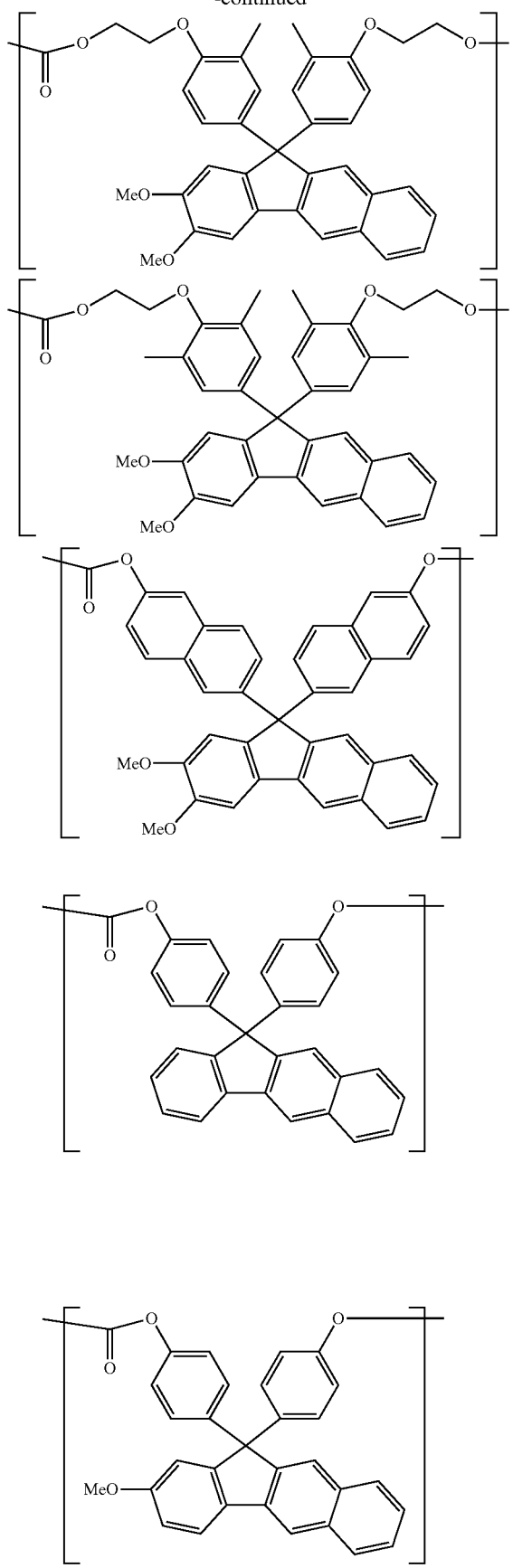

-continued
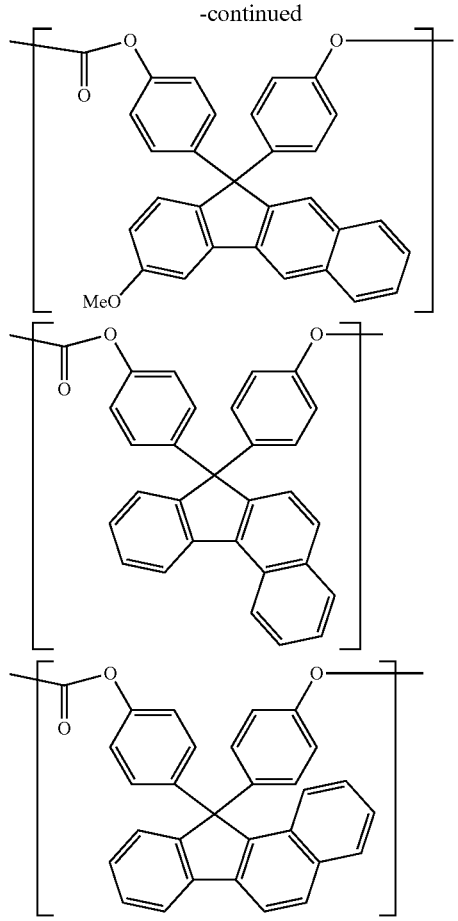
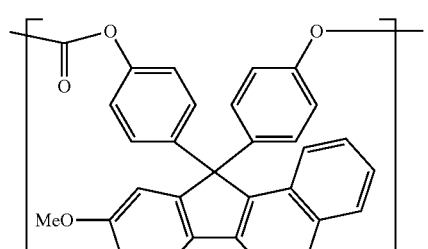
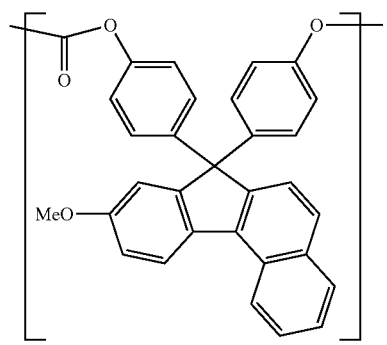
-continued
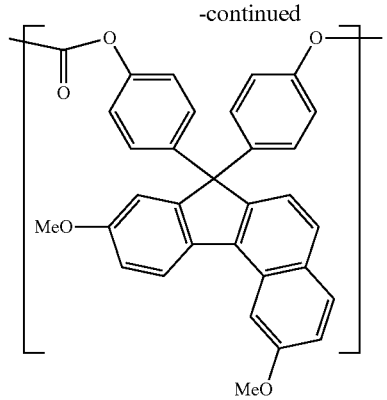
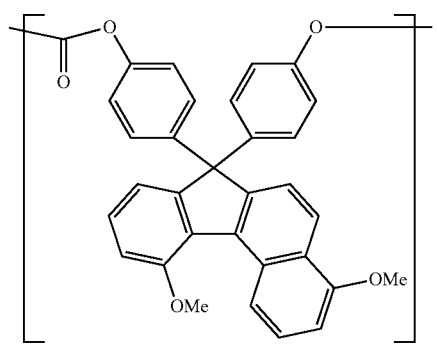
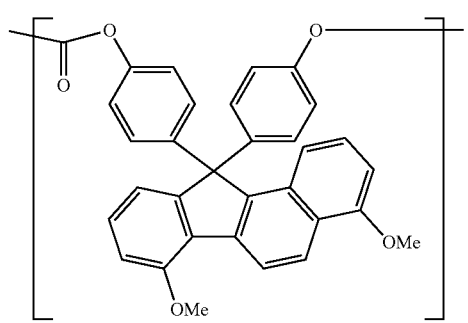

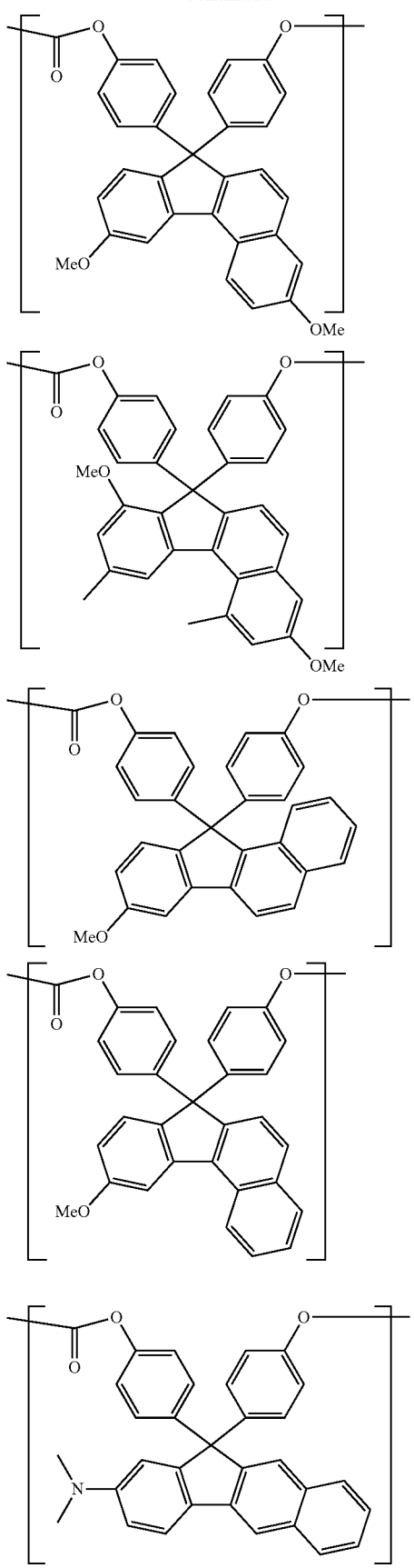

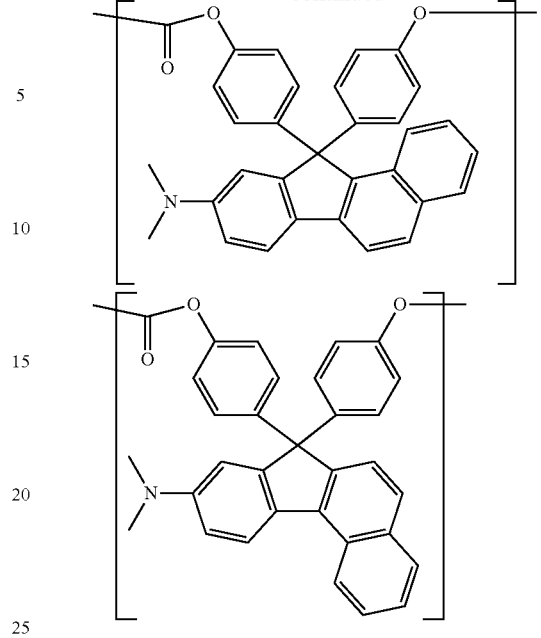

A method of obtaining the constitutional unit represented by Formula (1) is not particularly limited, and a compound to be a precursor may be obtained in a commercial way or may be manufactured by synthesis. In a case where the compound to be a precursor is manufactured by synthesis, the compound may be synthesized in a well-known method or a method described in the example.

The polycarbonate resin of the present invention is preferably a polycarbonate resin further including a constitutional unit represented by Formula (11). In a case where the polycarbonate resin further contains a constitutional unit represented by Formula (11), the moldability in a case where the polycarbonate resin is molded may be further increased, and thus the generation of the optical strain in the molded article may be effectively suppressed.

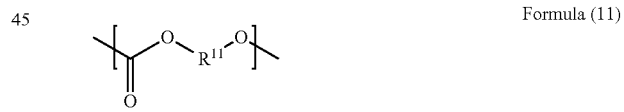

Formula (11)

In Formula (11), $R^1$ is a group including at least one selected from an alkylene group having 2 to 8 carbon atoms, a cycloalkylene group having 5 to 12 carbon atoms, an arylene group having 6 to 40 carbon atoms, and a heteroarylene group having 6 to 40 carbon atoms. The alkylene group, the cycloalkylene group, the arylene group, and the heteroarylene group described above preferably have a substituent, and the carbon atoms in the alkylene group and the cycloalkylene group may be substituted with an O atom or a S atom.

$R^{11}$ may be a linking group including the above groups, may be a linking group including only the above groups, or may be a linking group having a structure obtained by combining two or more of the above groups. $R^{11}$ may be a linking group containing at least one selected from an ether bond and a thioether bond between the above groups. In this case, at least one selected from an ether bond and a thioether bond may be present between groups of the same kind or may be present between different kinds of groups.

$R^{11}$ is a group not including —O—C(=O)—O—.

Among these, $R^{11}$ is preferably a group including at least one selected from an alkylene group having 2 to 8 carbon atoms and an arylene group having 6 to 40 carbon atoms and more preferably an alkylene group having 2 to 8 carbon atoms or a group having a structure obtained by combining an alkylene group having 2 to 8 carbon atoms and an arylene group having 6 to 40 carbon atoms.

Hereinafter, specific examples of $R^{11}$ of the constitutional unit represented by Formula (11) are listed, but the structure of $R^{11}$ is not limited to the following structure. In the following specific examples, * represents a linking site in a main chain of the constitutional unit represented by Formula (11).

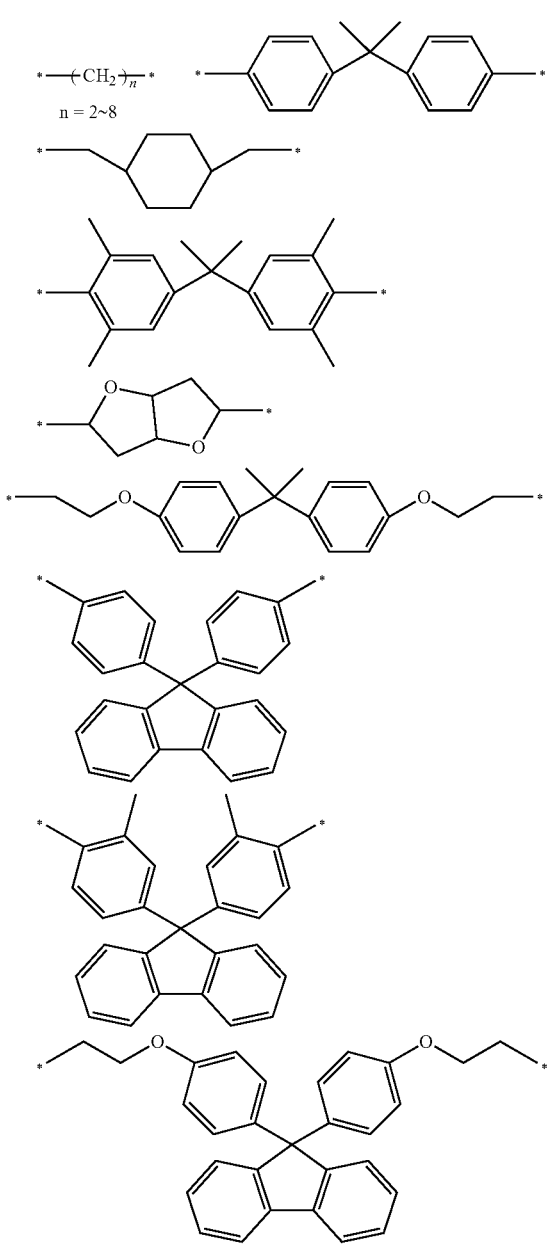

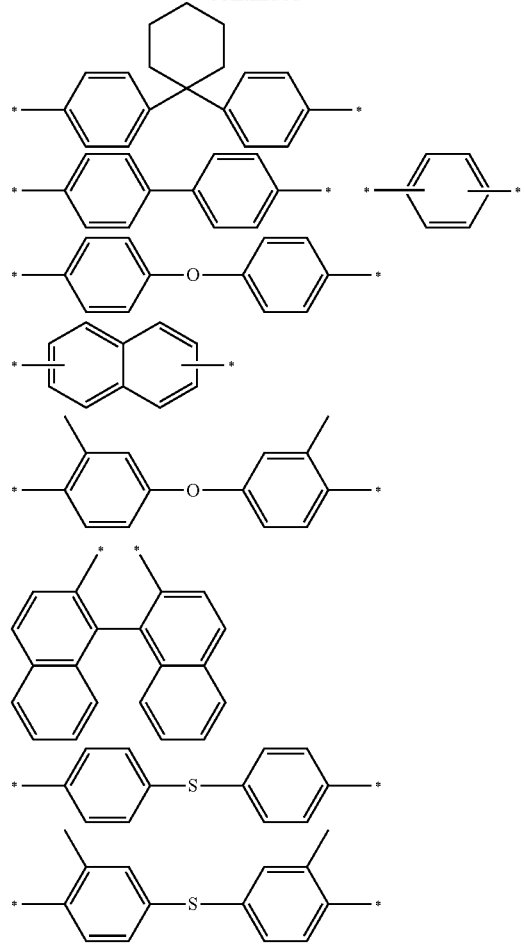

Among these, $R^{11}$ in the constitutional unit represented by Formula (11) is preferably a group represented by Structure (12) or (13).

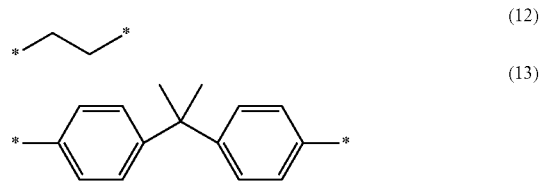

In Structures (12) and (13), * represents a linking site in a main chain of the constitutional unit represented by Formula (11).

A method of obtaining the constitutional unit represented by Formula (11) is not particularly limited, and the compound to be a precursor may be obtained in a commercial way or may be manufactured by synthesis. In a case where the compound to be a precursor is manufactured by synthesis, the compound may be synthesized in a well-known method or a method described in the example.

According to the present invention, the content of the constitutional unit represented by Formula (1) is preferably 40 mol % or more, more preferably 50 mol % or more, and even more preferably 70 mol % or more with respect to the entire constitutional unit of the polycarbonate resin.

In a case where the polycarbonate resin includes the constitutional unit represented by Formula (11), the content of the constitutional unit represented by Formula (11) is preferably 65 mol % or less, more preferably 50 mol % or less, even more preferably 45 mol % or less, and particularly preferably 40 mol % or less with respect to the entire constitutional unit of the polycarbonate resin. In a case where the proportion of the constitutional unit included in the polycarbonate resin is set to be in the above range, the Abbe number of the molded article may be more effectively reduced.

In a case where the polycarbonate resin includes the constitutional unit represented by Formula (11), the total amount of the constitutional unit represented by Formula (1) and the constitutional unit represented by Formula (11) is even more preferably 90 mol % or more with respect to the entire constitutional unit of the polycarbonate resin. Among these, the molar ratio of the constitutional unit represented by Formula (1) and the constitutional unit represented by Formula (11) is preferably 40:60 to 90:10. The proportion of the constitutional unit in the polycarbonate resin is in the above range, the molded article may have a low Abbe number, and the durability of the molded article may be further increased.

A viscosity average molecular weight of the polycarbonate resin of the present invention is preferably 10,000 or more, more preferably 12,000 or more, and even more preferably 13,000 or more. The viscosity average molecular weight of the polycarbonate resin is preferably 25,000 or less and more preferably 20,000 or less.

Here, the viscosity average molecular weight of the polycarbonate resin is calculated by dissolving the polycarbonate resin in 100 ml of methylene chloride and using the following equation from specific viscosity ($\eta_{sp}$) of the solution at 20° C.

$\eta_{sp}/c=[\eta]+0.45\times[\eta]^2 c$ (here, [$\eta$] is intrinsic viscosity)

$[\eta]=1.23\times10^{-4} M^{0.83}$ $c=0.7$ (Polymerization Method of Polycarbonate Resin)

The polycarbonate resin of the present invention may be polymerized by using well-known reaction means. Examples thereof include (a) a fusing method performed by reacting phosgene with at least one selected from dihydric phenol and a derivative of dihydric phenol or (b) a method of performing transesterification on at least one selected from dihydric phenol and a derivative of dihydric phenol by using a carbonate precursor material such as carbonic acid diester. Hereinafter, the at least one selected from dihydric phenol and a derivative of dihydric phenol is simply referred to as dihydric phenol in some cases.

As the dihydric phenol, the compound that may become the constitutional unit represented by Formula (1) is preferably used. As the derivative of dihydric phenol, a chlorocarbonic acid compound or the like that may become the constitutional unit represented by Formula (1) is preferably used.

In a case where the constitutional unit represented by Formula (11) is included as the constitutional unit of the polycarbonate resin, as the dihydric phenol or the derivative of the dihydric phenol, a compound that may become the constitutional unit represented by Formula (11) or the chlorocarbonic acid compound that may become the constitutional unit represented by Formula (11) may be used.

In a case where the polycarbonate resin is polymerized, a catalyst, a terminating agent, an antioxidant of dihydric phenol, a heat stabilizer, or the like may be used, if necessary.

The reaction using (a) the fusing method for reacting phosgene is the reaction between dihydric phenol and phosgene and is performed in the presence of an acid binder and an organic solvent. As the acid binder, for example, alkali metal hydroxide such as sodium hydroxide or potassium hydroxide or an amine compound such as pyridine is used. As the organic solvent, for example, halogenated hydrocarbon such as methylene chloride and chlorobenzene is used. In order to promote the reaction, for example, a catalyst such as tertiary amine such as triethylamine, tetra-n-butylammonium bromide, or tetra-n-butylphosphonium bromide, a quaternary ammonium compound, and a quaternary phosphonium compound may be used. In this case, it is preferable that the reaction temperature is usually at 0° C. to 40° C., the reaction time is about 10 minutes to 5 hours, and the pH during the reaction is maintained to 9 or more.

The reaction using (b) the transesterification method is transesterification reaction between dihydric phenol and carbonate ester, and is performed by a method of mixing dihydric phenol and carbonate ester while heating in the presence of an inert gas, and distilling off generated alcohol or phenol or the like. The reaction temperature varies depending on the boiling point of the generated alcohol or phenol but is generally in the range of 120° C. to 350° C. During the latter stage of the reaction, the system is depressurized to about $1.3\times10^3$ to $1.3\times10$ Pa such that the distillation of the generated alcohol or phenol is easily performed. The reaction time is generally about 1 to 4 hours.

Examples of the carbonate ester include ester such as an aryl group having 6 to 10 carbon atoms which may have a substituent, an aralkyl group, or an alkyl group having 1 to 4 carbon atoms. Specific examples thereof include diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, and dibutyl carbonate, and among these, diphenyl carbonate is preferable.

In the reaction using (b) the transesterification method, in order to increase the polymerization rate, a polymerization catalyst may be used, and as the polymerization catalyst, a catalyst used for general esterification reaction or transesterification reaction such as an alkali metal compound such as sodium hydroxide, potassium hydroxide, sodium salt of dihydric phenol, and potassium salt, an alkali earth metal compound such as calcium hydroxide, barium hydroxide, and magnesium hydroxide, a nitrogen-containing basic compound such as tetramethylammonium hydroxide, tetraethylammonium hydroxide, trimethylamine, and triethylamine, and alkoxides of alkali metal and alkaline earth metal, organic acid salts of alkali metal and alkali earth metal, zinc compounds, boron compounds, aluminum compounds, silicon compounds, germanium compounds, organotin compounds, lead compounds, osmium compounds, antimony compounds, manganese compounds, titanium compounds, and zirconium compounds may be used. The catalysts may be used singly or two or more kinds thereof may be used in combination. The usage amount of the polymerization catalyst is preferably $1\times10^{-8}$ to $1\times10^{-3}$ equivalent with respect to 1 mol of dihydric phenol of a raw material.

In the polymerization reaction, as the polycarbonate resin, monofunctional phenols that are generally used as a terminating agent may be used. For example, in the case of the reaction using phosgene, since monofunctional phenols are used as a terminating agent in order to adjust the molecular weight, and the obtained polycarbonate resin is sealed by a group of which the terminal is based on monofunctional phenols, heat stability is excellent.

(Method of Manufacturing Molded Article)

A molded article may be manufactured from a resin composition including the polycarbonate resin. Examples of the method of molding the molded article include hot pressure molding, and, for example, compression molding, injection molding, extrusion molding, blow molding, emboss molding, and the like may be employed. Among these, in a case of molding the molded article of the present invention, it is preferable to employ injection molding.

It is preferable to add an antioxidant such as triphenyl phosphite or tris(2,4-di-tert-butylphenyl) phosphite to a resin composition including a polycarbonate resin. The addition amount of the antioxidant is preferably 0.00001 to 0.0001 mass % with respect to the total mass of the resin composition.

It is preferable that, as an antistatic agent, an anionic surfactant, a cationic surfactant, a nonionic surfactant, an amphoteric surfactant, a surfactant mixture, or the like is added to the resin composition including the polycarbonate resin. Examples of the antistatic agent include monoglyceride stearate. The addition amount of the antistatic agent is preferably 0.01 to 0.1 mass % with respect to the total mass of the resin composition.

Before injection molding is performed, a resin composition including a polycarbonate resin may be pelletized. By pelletizing the polycarbonate resin, the handleability of the resin in a case of injection molding may be enhanced. In a case of pelletizing the resin composition, for example, a vent type single screw extruder or the like may be used.

In the case of injection molding, an injection molding machine (including an injection compression molding machine) is used. In the injection molding machine, a polycarbonate molten resin is collected on the tip of a cylinder, and then the polycarbonate molten resin is injected into a die and molded. As the injection molding machine, a generally used injection molding machine may be used. It is preferable that the cylinder is formed of a material having low adherence to the polycarbonate resin and exhibiting corrosion resistance and wear resistance. As an injection molding machine, for example, Micro-1 manufactured by Meiho Co., Ltd. can be exemplified.

The cylinder temperature in a case of injection molding is preferably 200° C. to 450° C. and more preferably 250° C. to 390° C. The temperature of the die is preferably 50° C. to 300° C. and more preferably 100° C. to 250° C.

It is preferable that the environment in which the molding process is carried out is as clean as possible. It is also preferable to sufficiently dry a material to be provided in the molding so as to remove moisture or to perform molding without retention which causes decomposition of the molten resin.

(Molded Article)

The present invention relates to a molded article of the above polycarbonate resin. In the molded article of the polycarbonate resin, in addition to the polycarbonate resin, an additive such as an antioxidant, an antistatic agent, or a heat stabilizer may be included. In a case where the molded article includes various additives, the content of the additive is preferably 5 mass % or less with respect to the total mass of the molded article.

As described below, the molded article of the present invention is preferably used in an application of an optical member, and among these, it is preferable to be used as a lens. In this point of view, it is preferable that the refractive index of the molded article is high. In the molded article of the present invention, a refractive index nD at a wavelength of 589 nm is preferably 1.45 or more, more preferably 1.58 or more, and particularly preferably 1.60 or more.

The molded article of the present invention preferably has a low Abbe number, in view of decreasing the chromatic aberration in a case of being used as a lens or the like among applications as an optical member. In the molded article of the present invention, the Abbe number is preferably 25 or less, more preferably 24.5 or less, even more preferably 23 or less, still even more preferably 21 or less, and particularly preferably 20 or less. The Abbe number of the molded article of the present invention is preferably 13 to or more.

In the present specification, an Abbe refractometer (manufactured by Kalnew Optical Industrial Co., Ltd.) is used, the refractive indexes nD, nF, and nC at wavelengths of 589 nm, 486 nm, and 656 nm are measured, and the Abbe number (νD) is calculated by the following equation.

$$\nu D=(nD-1)/(nF-nC)$$

Here, nD represents a refractive index at a wavelength of 589 nm, nF represents a refractive index at a wavelength of 486 nm, and nC represents a refractive index at a wavelength of 656 nm.

The maximum thickness of the molded article of the present invention is preferably 0.1 to 10 mm. The maximum thickness is more preferably 0.1 to 5 mm and particularly preferably 0.15 to 3 mm. The maximum diameter of the molded article of the present invention is preferably 1 to 1,000 mm. The maximum diameter is more preferably 2 to 200 mm and particularly preferably 2.5 to 100 mm. The molded article of this size is particularly useful as the application as an optical member having a high refractive index.

(Optical Member)

The present invention also relates to an optical member including the above molded article. The molded article of the present invention is a molded article having excellent optical properties, and thus is preferably used in an optical member. The type of the optical member of the present invention is not particularly limited, and the optical member may be suitably used as an optical member using the excellent optical properties of the molded article, particularly, an optical member (so-called passive optical member) that transmits light. Examples of the optical functional device having such an optical member include various display devices (liquid crystal display, plasma display, and the like), various projector devices (overhead projector (OHP), liquid crystal projector, and the like), an optical fiber communication device (optical waveguide, optical amplifier, and the like), and an imaging device such as cameras and video.

Examples of the passive optical member used in the optical functional device include a lens, a prism, a prism sheet, a panel (plate-like molded article), a film, an optical waveguide (having a film shape, a fiber shape, or the like), an optical disc, and a sealing agent of a light emitting diode (LED). Such a passive optical member may be provided with any coating layer, if necessary, for example, a protective layer for preventing mechanical damage of the coated surface such as friction or abrasion, a light absorbing layer for absorbing light having undesirable wavelengths causing deterioration of inorganic particles, a substrate, or the like, a permeation shielding layer for suppressing or preventing permeation of reactive low molecular weight molecules such as moisture and oxygen gas, an antiglare layer, an antireflection layer, a layer of a low refractive index, and any additional functional layers. Specific examples of the any coating layer include a transparent conductive film or a gas barrier film including an inorganic oxide coating layer, and a gas barrier film or a hard coat film including an organic substance coating layer. As a coating method, known coating methods such as a vacuum deposition method, a chemical vapor deposition (CVD) method, a sputtering method, a dip coating method, and a spin coating method may be used.

Application Example

The optical member using the molded article of the present invention is preferably used particularly in a lens substrate. The lens substrate manufactured by using the polycarbonate resin of the present invention has a low Abbe number, preferably further has a high refractive index, light transmittance, and light weight, and has excellent optical properties.

In the present specification, a "lens substrate" means a single member that may exhibit a lens function. A film or a member may be provided on the surface or the periphery of the lens substrate according to the use environment and application of the lens. For example, a protective film, an antireflection film, a hard coat film, and the like may be formed on the surface of the lens substrate. A composite lens obtained by laminating glass lens substrates or plastic lens substrates may be provided. The periphery of the lens substrate may be fitted and fixed into the substrate holding frame or the like. However, these films, frames, and the like are members to be added to the lens substrate and are distinguished from the lens substrate in the present specification.

In a case where the lens substrate is used as a lens, the lens substrate may be used as a lens alone, or the film, the frame, other lens substrates, and the like may be added to the lens substrate to be used as a lens. The types and the shapes of the lens using the lens substrate are not particularly limited.

The lens substrate has a low Abbe number, and thus may be preferably used in a chromatic aberration correcting lens, and the chromatic aberration correcting lens, for example, is preferably used for an image pickup lens of mobile phones, digital cameras, and the like, an imaging lens of televisions, video cameras, and the like, an in-vehicle lens, and an endoscope lens.

EXAMPLES

Hereinafter, characteristics of the present invention are more specifically described with reference to the examples and comparative examples. A material, a usage amount, a proportion, a treatment detail, a treatment order, and the like provided in the following examples can be suitably changed without departing from the gist of the present invention. Accordingly, the scope of the present invention should not be construed in a limited manner by the following specific examples.

Example 1

210 g of Compound 1A was obtained by using a synthesis method disclosed in JP2015-193809A.

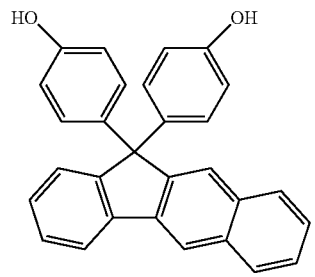

Compound 1A 111 g of triphosgene, 1 L of ethyl acetate, and 200 g of Compound 1A were introduced to the reaction vessel, and 122 g of dimethylaniline was added dropwise over two hours under stirring while being maintained at 5° C. or less. Thereafter, the reaction was performed by stirring for one hour while being maintained at 15° C. or lower. 500 mL of 0.1 mol/L (0.1 N) hydrochloric acid water was added to the reaction vessel, a liquid separation treatment was performed to remove an aqueous layer, and then ethyl acetate was distilled off under reduced pressure so as to obtain 275 g of Compound 1B.

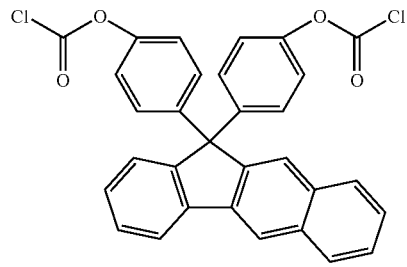

Compound 1B 100 g of Compound 1A, 131 g of Compound 1B, and 1 L of methylene chloride were introduced to a reaction vessel, and 50 ml of pyridine was added dropwise under stirring over two hours while being maintained at 10° C. or less. Thereafter, the reaction was performed by stirring for one hour while being maintained at 15° C. or lower. 500 mL of 0.01 mol/L (0.01 N) hydrochloric acid water was added to the reaction vessel, and a liquid separation treatment was performed. After an aqueous layer was removed, 4 L of methanol was added, a polycarbonate resin was precipitated, and collection by filtration was performed, so as to obtain 215 g of a polycarbonate resin. The viscosity average molecular weight of the polycarbonate resin was 14,400.

Example 2

290 g of 5,6-dimethoxy-1-indanone and 204 g of orthophthalaldehyde were dissolved in 1,500 mL of methanol. The reaction solution was warmed and maintained at 60° C., and 255 g of potassium hydroxide was dissolved in 1,750 mL of methanol and added dropwise. After being stirred for five hours, the reaction solution was returned to room temperature, and precipitated crystals were collected by filtration to obtain 230 g of Compound 2a.

Compound 2a

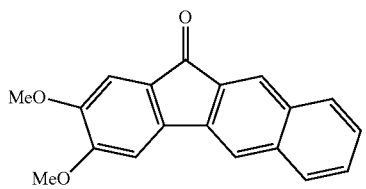

200 g of Compound 2a and 320 g of phenol were dissolved in 320 mL of methanesulfonic acid. The reaction solution was warmed and maintained at 60° C., and 3.2 mL of 3-mercaptopropionic acid was added dropwise. After being stirred for five hours, 720 mL of methanol was added dropwise to the reaction solution and, the mixture was stirred for 30 minutes, 1,400 mL of methanol was further added dropwise. The reaction solution was returned to room temperature, and precipitated crystals were collected by filtration to obtain 292 g of Compound 2A.

Compound 2A

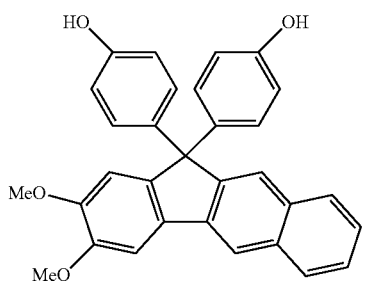

96 g of triphosgene, 1 L of ethyl acetate, and 200 g of Compound 2A were introduced to a reaction vessel, and, while being maintained at 5° C. or less under stirring, 105 g of dimethylaniline was added dropwise over two hours. Thereafter, while being maintained at 15° C. or less, the reaction was performed by stirring for one hour. 500 mL of 0.1 mol/L (0.1 N) hydrochloric acid water was added to the reaction vessel, a liquid separation treatment was performed to remove an aqueous layer, and then ethyl acetate was distilled off under reduced pressure so as to obtain 268 g of Compound 2B. A Hammett substituent constant $\sigma_p$ value of a substituent (methoxy group) corresponding to $R^1$ to $R^4$ of Formula (1) in Compound 2B was −0.28.

Compound 2B

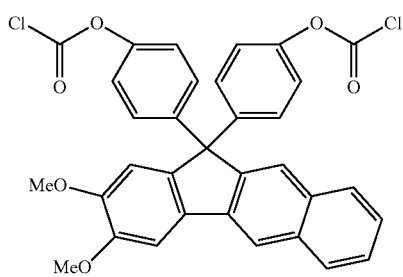

A polycarbonate resin was obtained by polymerization in the same manner as in Example 1, except for 100 g of Compound 2A and 127 g of Compound 2B were used instead of Compounds 1A and 1B. The viscosity average molecular weight of the polycarbonate resin was 15,100.

Example 3

A polycarbonate resin was obtained by polymerization in the same manner as in Example 1, except that 60 g of Compound 2A, 127 g of Compound 2B, and 5.4 g of ethylene glycol (EG) were used instead of Compounds 1A and 1B. The viscosity average molecular weight of the polycarbonate resin was 17,400.

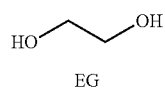

EG

Example 4

A polycarbonate resin was obtained by polymerization in the same manner as in Example 1, except that 60 g of Compound 2A, 127 g of Compound 2B, and 19.8 g of bisphenol A (BPA) were used instead of Compounds 1A and 1B. The viscosity average molecular weight of the polycarbonate resin was 13,200.

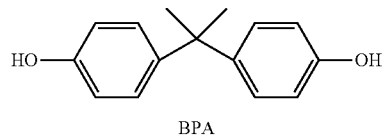 [SMILES: CC(C)(c1ccc(O)cc1)c1ccc(O)cc1]

BPA

Example 5

A polycarbonate resin was obtained by polymerization in the same manner as in Example 1, except that 60 g of Compound 2A, 127 g of Compound 2B, and 38.1 g of 9,9-bis(4-(2-hydroxyethoxy)phenyl) fluorene (BPEF) were used instead of Compounds 1A and 1B. The viscosity average molecular weight of the polycarbonate resin was 18,300.

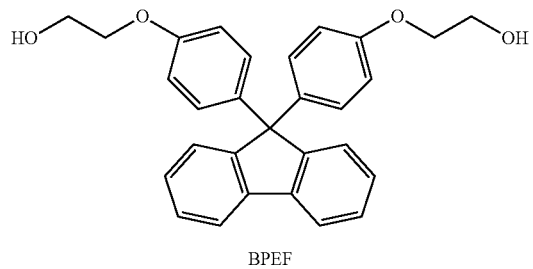 [SMILES: OCCOc1ccc(C2(c3ccc(OCCO)cc3)c3ccccc3-c3ccccc32)cc1]

BPEF

Example 6

A polycarbonate resin was obtained by polymerization in the same manner as in Example 1, except that 10 g of Compound 2A, 127 g of Compound 2B, and 12.1 g of ethylene glycol (EG) were used instead of Compounds 1A and 1B. The viscosity average molecular weight of the polycarbonate resin was 13,300.

Example 7

A polycarbonate resin was obtained by polymerization in the same manner as in Example 1, except that 127 g of Compound 2B and 13.5 g of ethylene glycol (EG) were used instead of Compounds 1A and 1B. The viscosity average molecular weight of the polycarbonate resin was 16,700.

Example 8

A polycarbonate resin was obtained by polymerization in the same manner as in Example 1, except that 127 g of Compound 2B and 49.6 g of bisphenol A (BPA) were used instead of Compounds 1A and 1B. The viscosity average molecular weight of the polycarbonate resin was 18,500.

Example 9

A polycarbonate resin was obtained by polymerization in the same manner as in Example 1, except that 127 g of Compound 2B and 95.2 g of 9,9-bis(4-(2-hydroxyethoxy) phenyl) fluorene (BPEF) were used instead of Compounds 1A and 1B. The viscosity average molecular weight of the polycarbonate resin was 13,500.

Example 10

138.2 g of a 48 mass % sodium hydroxide aqueous solution and 600 mL of ion exchange water were introduced to a reaction vessel, and 120 g of Compound 2A, 59.4 g of bisphenol A, and 0.30 g of hydrosulfite were dissolved therein, and 340 ml of methylene chloride was added. 64.0 g of phosgene was blown over about one hour at 20° C. under stirring, 8.6 g of a 48 mass % sodium hydroxide aqueous solution and 1.41 g of p-tert-butylphenol were added and stirred again, and 0.07 g of triethylamine was added in an emulsified state, stirring was performed at 30° C. for one hour, and the reaction was completed. The reaction solution was diluted with methylene chloride and washed with water repeatedly. Subsequently, 2 L of methanol was added dropwise to this solution over one hour, a polycarbonate resin was precipitated and collected by filtration so as to obtain 183 g of a polycarbonate resin. The viscosity average molecular weight of the polycarbonate resin was 19,300.

Comparative Example 1

A polycarbonate resin was obtained in the same manner as in Example 1 of JP2010-254806A. Structures of 9,9-bis(4-hydroxy-3-methylphenyl) fluorene (BCF) and bis(4-hydroxy-3-methylphenyl) sulfide (HMPS) used in Example 1 of JP2010-254806A were as follows.

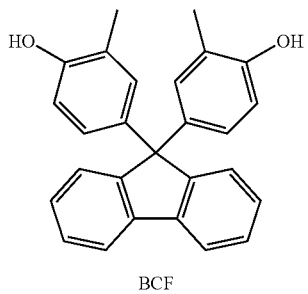

BCF

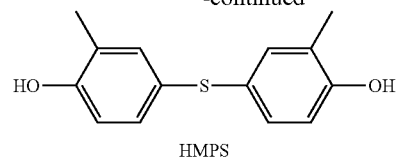

HMPS

Comparative Example 2

A polycarbonate resin was obtained in the same manner as in Comparative Example 3 of JP2010-254806A. Structures of 9,9-bis(4-hydroxyphenyl) fluorene (BPFL) used in Comparative Example 3 of JP2010-254806A were as follows.

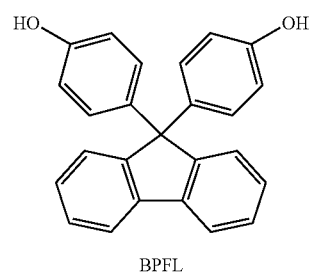

BPFL

Comparative Example 3

145 g of triphosgene, 1 L of ethyl acetate, and 200 g of BPFL were introduced to a reaction vessel and 159 g of dimethylaniline was added dropwise over two hours while being maintained at 5° C. or less under stirring. Thereafter, while the temperature was maintained at 15° C. or less, reaction was performed under stirring for one hour. 500 mL of 0.1 mol/L (0.1 N) hydrochloric acid water was added to the reaction vessel, a liquid separation treatment was performed to remove an aqueous layer, and then ethyl acetate was distilled off under reduced pressure so as to obtain 256 g of a BPFL chlorocarbonate compound.

The polycarbonate resin was obtained by polymerization in the same manner as in Example 1, except that 100 g of BPFL and 136 g of the BPFL chlorocarbonate compound were used instead of Compounds 1A and 1B. The viscosity average molecular weight of the polycarbonate resin was 16,900.

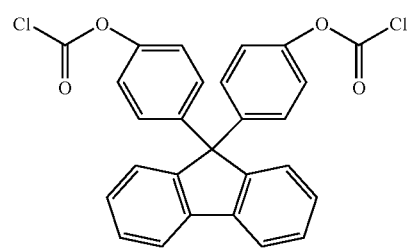

BPFL chlorocarbonate compound

Comparative Example 4

The polycarbonate resin was obtained by polymerization in the same manner as in Example 1, except that 60 g of BPFL, 136 g of the BPFL chlorocarbonate compound, and 7.1 g of ethylene glycol (EG) were used instead of Compounds 1A and 1B. The viscosity average molecular weight of the polycarbonate resin was 17,400.

(Measurement of viscosity average molecule of polycarbonate resin)

The viscosity average molecular weight of each of the polycarbonate resins obtained in the examples and comparative examples was calculated by dissolving the polycarbonate resin in 100 ml of methylene chloride to obtain a solution and using the following equation from specific viscosity ($\eta_{sp}$) of the solution at 20° C.

$$\eta_{sp}/c=[\eta]+0.45\times[\eta]^2 c \text{ (here, } [\eta] \text{ is intrinsic viscosity)}$$

$$[\eta]=1.23\times10^{-4} M^{0.83}$$

$$c=0.7$$

(Manufacturing of Molded Article)

After the polycarbonate resins obtained in examples and comparative examples were dried at 100° C. for 24 hours, 0.0025 mass % of tris(2,4-di-tert-butylphenyl) phosphite and 0.05 mass % of monoglyceride stearate were added and uniformly mixed. Thereafter, the mixture was pelletized using a vent type single screw extruder and then injection molding was performed by using an injection molding machine (Micro-1, manufactured by Meiho Co., Ltd.). In the injection molding, a molded article having a thickness of 1.0 mm, a width of 10 mm, and a length of 20 mm was molded as a molded article for evaluation at a cylinder temperature of 360° C. and a die temperature of a temperature presented in Table 1.

(Evaluation)

<Refractive Index and Abbe Number>

The Refractive index and the Abbe number (νD) of the molded article for evaluation were measured by using the Abbe refractometer (manufactured by Kalnew Optical Industrial Co., Ltd.).

$$\nu D=(nD-1)/(nF-nC)$$

Here, nD represents a refractive index at a wavelength of 589 nm, nF represents a refractive index at a wavelength of 486 nm, and nC represents a refractive index at a wavelength of 656 nm. In the column of the refractive index of Table 1, a refractive index at a wavelength of 589 nm is presented.

<Moldability (Optical Strain)>

Evaluation was performed by sandwiching the molded article for evaluation between two polarizing plates and visually observing light leakage from the back by using a direct nicole method.

A: There was no light leakage
B: Light leakage was slightly recognized
C: Light leakage was conspicuous <Moisture and Heat Test (Durability Under High Temperature and High Humidity)>

The molded article for evaluation was introduced to a constant temperature and humidity tank maintained at 85° C. and a relative humidity of 85% and was stored for 24 hours, and then was taken out. Next, after the molded article for evaluation was left at 25° C. and a relative humidity of 60% for one hour, the refractive index of the molded article for evaluation was evaluated.

A: A refractive index change before and after a moisture and heat test was 0.0005 or less
B: A refractive index change before and after a moisture and heat test was more than 0.0005 and 0.001 or less
C: A refractive index change before and after a moisture and heat test was more than 0.001

TABLE 1

| | | | Example 1 | Example 2 | Example 3 | Example 4 | Example 5 | Example 6 | Example 7 | Example 8 |
|---|---|---|---|---|---|---|---|---|---|---|
| Constitutional unit represented by Formula (1) | Compound 1A | [mol %] | 50 | | | | | | | |
| | Compound 2A | [mol %] | | 50 | 30 | 30 | 30 | 5 | | |
| | Compound 1B | [mol %] | 50 | | | | | | | |
| | Compound 2B | [mol %] | | 50 | 50 | 50 | 50 | 50 | 50 | 50 |
| Constitutional unit represented by Formula (11) | Ethylene glycol (EG) | [mol %] | | | 20 | | | 45 | 50 | |
| | Bisphenol A (BPA) | [mol %] | | | | 20 | | | | 50 |
| | 9,9-Bis(4-hydroxyphenyl) fluorene (BPFL) | [mol %] | | | | | | | | |
| | BPFL chlorocarbonate compound | [mol %] | | | | | | | | |
| | 9,9-Bis(4-(2-hydroxyethoxy)phenyl) fluorene (BPEF) | [mol %] | | | | | 20 | | | |
| | 9,9-Bis(4-hydroxy-3-methylphenyl) fluorene (BCF) | [mol %] | | | | | | | | |
| | Bis(4-hydroxy-3-methylphenyl) sulfide (HMPS) | [mol %] | | | | | | | | |
| Molding condition | Molding temperature (Die temperature) | [° C.] | 200 | 200 | 160 | 180 | 170 | 135 | 120 | 170 |
| Evaluation | Refractive index | — | | 1.65 | 1.66 | 1.63 | 1.64 | 1.64 | 1.62 | 1.60 | 1.62 |
| | Abbe number | — | | 18.5 | 15.9 | 16.5 | 16.8 | 17.1 | 19.3 | 20.8 | 19.5 |
| | Moldability (optical strain) | — | | B | B | A | A | A | A | A | A |
| | Moisture and heat test (Durability under high temperature and high humidity) | — | | A | A | A | A | A | A | A | A |

TABLE 1-continued

|  |  |  | Example 9 | Example 10 | Comparative Example 1 | Comparative Example 2 | Comparative Example 3 | Comparative Example 4 |
|---|---|---|---|---|---|---|---|---|
| Constitutional unit represented by Formula (1) | Compound 1A | [mol %] |  |  |  |  |  |  |
|  | Compound 2A | [mol %] |  | 38 |  |  |  |  |
|  | Compound 1B | [mol %] |  |  |  |  |  |  |
|  | Compound 2B | [mol %] | 50 |  |  |  |  |  |
| Constitutional unit represented by Formula (11) | Ethylene glycol (EG) | [mol %] |  |  |  |  |  | 20 |
|  | Bisphenol A (BPA) | [mol %] |  | 62 |  | 30 |  |  |
|  | 9,9-Bis(4-hydroxyphenyl) fluorene (BPFL) | [mol %] |  |  |  | 70 | 50 | 30 |
|  | BPFL chlorocarbonate compound | [mol %] |  |  |  |  | 50 | 50 |
|  | 9,9-Bis(4-(2-hydroxyethoxy)phenyl) fluorene (BPEF) | [mol %] | 50 |  |  |  |  |  |
|  | 9,9-Bis(4-hydroxy-3-methylphenyl) fluorene (BCF) | [mol %] |  |  | 50 |  |  |  |
|  | Bis(4-hydroxy-3-methylphenyl) sulfide (HMPS) | [mol %] |  |  | 50 |  |  |  |
| Molding condition | Molding temperature (Die temperature) | [° C.] | 170 | 140 | 120 | 190 | 200 | 180 |
| Evaluation | Refractive index |  | — | 1.64 | 1.62 | 1.63 | 1.62 | 1.63 | 1.61 |
|  | Abbe number |  | — | 19.8 | 24.5 | 24.8 | 25.4 | 24.2 | 25.5 |
|  | Moldability (optical strain) |  | — | A | B | B | B | B | B |
|  | Moisture and heat test (Durability under high temperature and high humidity) |  | — | A | B | C | C | C | C |

From Table 1, the molded article molded from the polycarbonate resin in the example has a low Abbe number and durability under high temperature and high humidity. In the molded article molded from the polycarbonate resin of the example, moldability was satisfactory, and the generation of an optical strain was small.

Meanwhile, in the molded articles molded from the polycarbonate resins of the comparative examples, the Abbe number was high, and the durability under high temperature and high humidity was deteriorated.

(Manufacturing of Composite Lens)

After the polycarbonate resin obtained in the example was dried for 24 hours at 100° C., 0.0025 mass % of tris(2,4-di-tert-butylphenyl) phosphite and 0.05 mass % of monoglyceride stearate were added, and uniformly mixed. Thereafter, after pelletization using a vent type single screw extruder, the polycarbonate resin obtained in the example was injected into a molding die having a surface treated with chromium nitride, a transparent glass lens (convex lens in which glass material=BK7, diameter of 33 mm, center thickness of 3 mm, radius of curvature of the surface in contact with the resin=44.3 mm, and radius of curvature of the surface not in contact with the resin=330.9 mm) was applied so as to cover all the surfaces on the side not in contact with the molding die of the resin and was spread such that the diameter of the resin became 30 mm. Thereafter, after cooling, the molded article and the die were separated so as to manufacture the composite lens.

What is claimed is:

1. A polycarbonate resin having a constitutional unit represented by Formula (1);

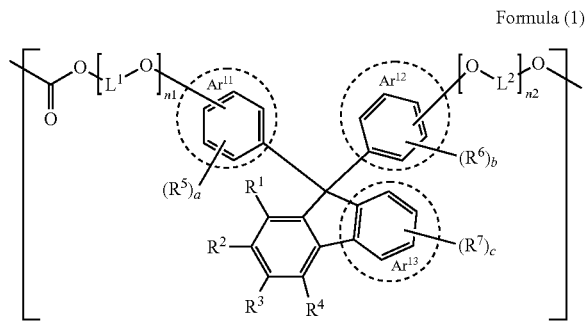

Formula (1)

wherein $R^1$ to $R^4$ are each independently a hydrogen atom or a substituent having a Hammett substituent constant $\sigma_p$ value of less than −0.15, except for an aryl group, a heteroaryl group, and a substituent having a reactive group, and in $R^1$ to $R^4$, substituents adjacent to each other are not bonded to each other to form a fused ring; $R^5$ to $R^7$ each independently represent a substituent;

a to c are each independently 0 or more and represent an integer of the maximum number or less by which each ring is substitutable;

$Ar^{11}$ and $Ar^{12}$ each independently represent an aryl group including a benzene ring surrounded by a broken line or a heteroaryl group including a benzene ring surrounded by a broken line as one of fused rings, and $Ar^{13}$ is an aromatic fused ring group including a benzene ring surrounded by a broken line as one of fused rings;

$L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;

n1 and n2 each independently represent an integer of 0 to 10;

in a case where $Ar^{11}$ and $Ar^{12}$ are each independently an aromatic fused ring group including a benzene ring surrounded by a broken line, $R^5$, $R^6$, $—O-[L^1-O]_{n1}—$, and $—O-[L^2-O]_{n2}—$ may be each independently substituted at a benzene ring surrounded by a broken line or substituted at a fused ring other than the benzene ring surrounded by a broken line; and $R^7$ may be substituted at a benzene ring surrounded by a broken line or may be substituted at a fused ring other than the benzene ring surrounded by a broken line.

2. The polycarbonate resin according to claim 1, wherein the constitutional unit is a constitutional unit represented by Formula (2);

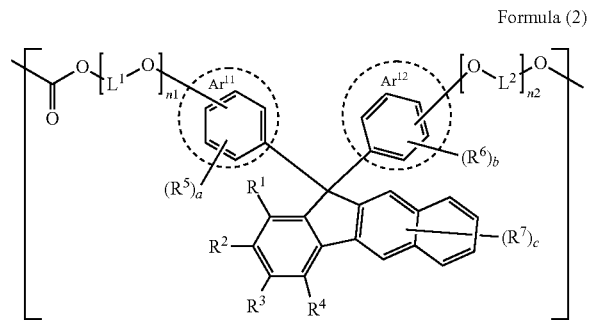

Formula (2)

wherein $R^1$ to $R^4$ are each independently a hydrogen atom or a substituent having a Hammett substituent constant $\sigma_p$ value of less than −0.15, except for an aryl group, a heteroaryl group, and a substituent having a reactive group, and in $R^1$ to $R^4$, substituents adjacent to each other are not bonded to each other to form a fused ring;

$R^5$ to $R^7$ each independently represent a substituent;

a to c are each independently 0 or more and represent an integer of the maximum number or less by which each ring is substitutable;

$Ar^{11}$ and $Ar^{12}$ each independently represent an aryl group including a benzene ring surrounded by a broken line or a heteroaryl group including a benzene ring surrounded by a broken line as one of fused rings;

$L^1$ and $L^2$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;

n1 and n2 each independently represent an integer of 0 to 10; and in a case where $Ar^{11}$ and $Ar^{12}$ are each independently an aromatic fused ring group including a benzene ring surrounded by a broken line as one of fused rings, $R^5$, $R^6$, $—O-[L^1-O]_{n1}—$, and $—O-[L^2-O]_{n2}—$ may be each independently substituted at a benzene ring surrounded by a broken line or substituted at a fused ring other than the benzene ring surrounded by a broken line.

3. The polycarbonate resin according to claim 1, wherein at least one of $R^1$, $R^2$, $R^3$, or $R^4$ is a substituent having a Hammett substituent constant $\sigma_p$ value of less than −0.15, except for an aryl group, a heteroaryl group, and a substituent having a reactive group.

4. The polycarbonate resin according to claim 1, wherein $R^2$ and $R^3$ are substituents having a Hammett substituent constant $\sigma_p$ value of less than −0.15, except for an aryl group, a heteroaryl group, and a substituent having a reactive group.

5. The polycarbonate resin according to claim 1, wherein $R^2$ and $R^3$ are methoxy groups.

6. The polycarbonate resin according to claim 1, further having a constitutional unit represented by Formula (11);

Formula (11)

wherein $R^{11}$ is a group including at least one selected from an alkylene group having 2 to 8 carbon atoms, a cycloalkylene group having 5 to 12 carbon atoms, an arylene group having 6 to 40 carbon atoms, and a heteroarylene group having 6 to 40 carbon atoms.

7. The polycarbonate resin according to claim 6, wherein $R^{11}$ in the constitutional unit represented by Formula (11) includes a group represented by Structure (12) or (13);

(12)

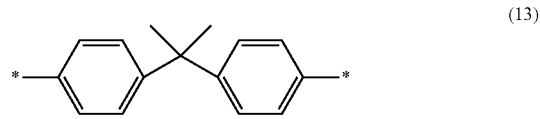

(13)

wherein * represents a linking site in a main chain of the constitutional unit represented by Formula (11).

8. The polycarbonate resin according to claim 6,
wherein a total amount of the constitutional unit represented by Formula (1) and the constitutional unit represented by Formula (11) is 90 mol % or more with respect to the entire constitutional unit of the polycarbonate resin, and
wherein a molar ratio of the constitutional unit represented by Formula (1) and the constitutional unit represented by Formula (11) is 40:60 to 90:10.

9. A molded article of the polycarbonate resin according to claim 1.

10. The molded article according to claim 9, wherein an Abbe number is 13 to 25.

11. An optical member comprising the molded article according to claim 9.

12. A lens comprising the molded article according to claim 9.

* * * * *